US012050428B2

(12) United States Patent
Kyotani et al.

(10) Patent No.: US 12,050,428 B2
(45) Date of Patent: Jul. 30, 2024

(54) IMAGE FORMING APPARATUS REQUESTING EXECUTION OF DENSITY CORRECTION PROCESS

(71) Applicant: BROTHER KOGYO KABUSHIKI KAISHA, Nagoya (JP)

(72) Inventors: Tadao Kyotani, Nagoya (JP); Keigo Nakajima, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 18/303,942

(22) Filed: Apr. 20, 2023

(65) Prior Publication Data

US 2023/0266703 A1 Aug. 24, 2023

Related U.S. Application Data

(63) Continuation of application No. 17/734,373, filed on May 2, 2022, now Pat. No. 11,675,304, which is a (Continued)

(30) Foreign Application Priority Data

Nov. 18, 2019 (JP) ................................ 2019-207739

(51) Int. Cl.
*G03G 15/00* (2006.01)
*G03G 15/08* (2006.01)
*G03G 21/18* (2006.01)

(52) U.S. Cl.
CPC ....... *G03G 15/553* (2013.01); *G03G 15/0863* (2013.01); *G03G 15/556* (2013.01); *G03G 21/1821* (2013.01); *G03G 21/1889* (2013.01)

(58) Field of Classification Search
CPC . G03G 15/0863; G03G 15/553; G03G 15/556
(Continued)

(56) References Cited

U.S. PATENT DOCUMENTS 6,301,450 B1 10/2001 Kojima et al.
6,546,212 B1 4/2003 Ogata et al.
(Continued)

FOREIGN PATENT DOCUMENTS

CN 109557784 * 4/2019
JP 10-105021 A 4/1998
(Continued)

OTHER PUBLICATIONS

Office Action issued in corresponding Japanese Application No. 2010-039280, Jan. 30, 2024.
(Continued)

*Primary Examiner* — Hoan H Tran
(74) *Attorney, Agent, or Firm* — Merchant & Gould P.C.

(57) ABSTRACT

In an image forming apparatus a toner cartridge includes a toner memory storing toner identification information. The toner cartridge is detachably attachable to a drum cartridge. The drum cartridge includes a drum memory storing drum identification information. The drum cartridge is detachably attached to the main-body casing. A controller performs a request process to request execution of a density correction process to correct a density of developer, in a case where a toner identification information determination process determines that the toner identification information stored in the toner memory does not match the toner identification information which is stored in the main-body memory in a toner identification information storing process or a drum identification information determination process determines that the drum identification information stored in the drum memory does not match the drum identification information which is stored in the main-body memory in the drum identification information storing process.

8 Claims, 8 Drawing Sheets

Related U.S. Application Data continuation of application No. 17/096,118, filed on Nov. 12, 2020, now Pat. No. 11,372,359.

(58) Field of Classification Search
USPC ...................................................... 399/12, 24
See application file for complete search history.

(56) References Cited

U.S. PATENT DOCUMENTS

| | | | |
|---|---|---|---|
| 7,580,647 B2 | 8/2009 | Komiya | |
| 8,861,994 B2 | 10/2014 | Ishii | |
| 2004/0105689 A1 | 6/2004 | Shimura et al. | |
| 2010/0172659 A1 | 7/2010 | Jeon | |
| 2017/0075277 A1* | 3/2017 | Kanakubo | G03G 15/556 |
| 2019/0196394 A1 | 6/2019 | Yabuki et al. | |

FOREIGN PATENT DOCUMENTS

| | | |
|---|---|---|
| JP | 2001-117469 A | 4/2001 |
| JP | 2001-134153 A | 5/2001 |
| JP | 2003-307975 A | 10/2003 |
| JP | 2005-10583 A | 1/2005 |
| JP | 2005-241721 A | 9/2005 |
| JP | 2010-39280 A | 2/2010 |
| JP | 2019-86636 A | 6/2019 |
| JP | 2019-117346 A | 7/2019 |
| JP | 2019-128588 A | 8/2019 |

OTHER PUBLICATIONS

Office Action issued in corresponding Japanese Patent Application No. 2019-207739, Sep. 19, 2023.
Office Action issued in corresponding Japanese Application No. 2019-207739, Jan. 30, 2024.

* cited by examiner

IMAGE FORMING APPARATUS REQUESTING EXECUTION OF DENSITY CORRECTION PROCESS

CROSS REFERENCE TO RELATED APPLICATION

This application is a continuation of U.S. patent application Ser. No. 17/734,373, filed May 2, 2022, which is a continuation of U.S. patent application Ser. No. 17/096,118, filed Nov. 12, 2020, now U.S. Pat. No. 11,372,359, which claims priority from Japanese Patent Application No. 2019-207739 filed Nov. 18, 2019. The entire content of the priority applications is incorporated herein by reference.

TECHNICAL FIELD

The present disclosure relates to an image forming apparatus.

BACKGROUND

Conventionally, there are known electrophotographic image forming apparatuses such as laser printers and light-emitting diode (LED) printers. Such a known image forming apparatus includes a process cartridge mounted in a main body of the image forming apparatus. The process cartridge includes a photosensitive drum and a developing roller.

A memory is attached to the process cartridge and stores identification information for individually identifying the process cartridge. In a case where the main body of the image forming apparatus determines, based on the identification information, that a new process cartridge is mounted, the main body of the image forming apparatus performs density correction, such as adjusting a developing bias, to correct image density.

SUMMARY

There is also know an image forming apparatus of a separation type. In the image forming apparatus of the separation type, a drum cartridge including a photosensitive drum and a toner cartridge including a developing roller can be independently replaced. There is a need for the image forming apparatus of this type to perform density correction in a case where the drum cartridge or the toner cartridge is replaced.

It is an object of the present disclosure to provide a technique of appropriately performing density correction in a case where the drum cartridge or the toner cartridge is replaced.

In order to attain the above and other objects, the disclosure provides an image forming apparatus. The image forming apparatus includes a developing roller, at least one toner cartridge, at least one drum cartridge, and a main-body casing. The toner cartridge includes a developing roller, and a toner memory storing toner identification information for identifying the toner cartridge. The toner cartridge is detachably attachable to at least one drum cartridge. The drum cartridge includes a photosensitive drum, and a drum memory storing drum identification information for identifying the drum cartridge. The drum cartridge is detachably attached to the main-body casing. The main-body casing includes a main-body memory, and a controller configured to perform: a toner identification information storing process to store the toner identification information stored in the toner memory to the main-body memory; a drum identification information storing process to store the drum identification information stored in the drum memory to the main-body memory; a replacement determination process to determine whether a replacement operation related to replacement of the toner cartridge or the drum cartridge is detected; a toner identification information determination process to determine whether or not the toner identification information stored in the toner memory matches the toner identification information which is stored in the main-body memory in the toner identification information storing process, in a case where the replacement determination process determines that the replacement operation is detected; a drum identification information determination process to determine whether or not the drum identification information stored in the drum memory matches the drum identification information which is stored in the main-body memory in the drum identification information storing process, in the case where the replacement determination process determines that the replacement operation is detected; a request process to request execution of a density correction process to correct a density of developer to be supplied to a printing base material, in a case where the toner identification information determination process determines that the toner identification information stored in the toner memory does not match the toner identification information which is stored in the main-body memory in the toner identification information storing process or the drum identification information determination process determines that the drum identification information stored in the drum memory does not match the drum identification information which is stored in the main-body memory in the drum identification information storing process.

BRIEF DESCRIPTION OF THE DRAWINGS

The particular features and advantages of the disclosure as well as other objects will become apparent from the following description taken in connection with the accompanying drawings, in which.

DETAILED DESCRIPTION

An embodiment of the present disclosure will be described below. A direction in which a rotation center axis (developing axis) of a developing roller in a toner cartridge extends will be referred to as a "first direction".

1. Embodiment

Figure 1:
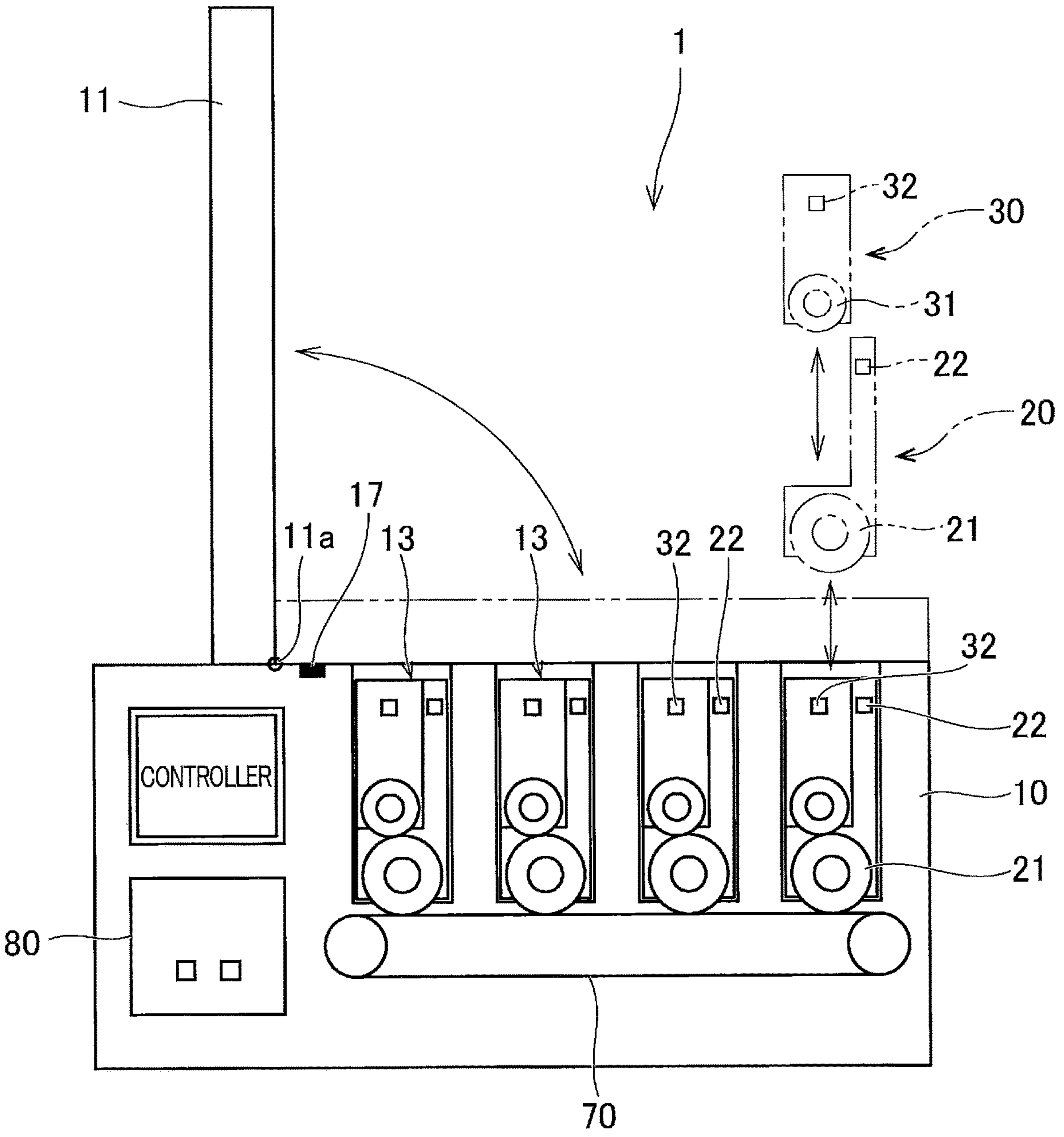
FIG. 1 is a schematic view of an image forming apparatus according to an embodiment.
Figure 2:
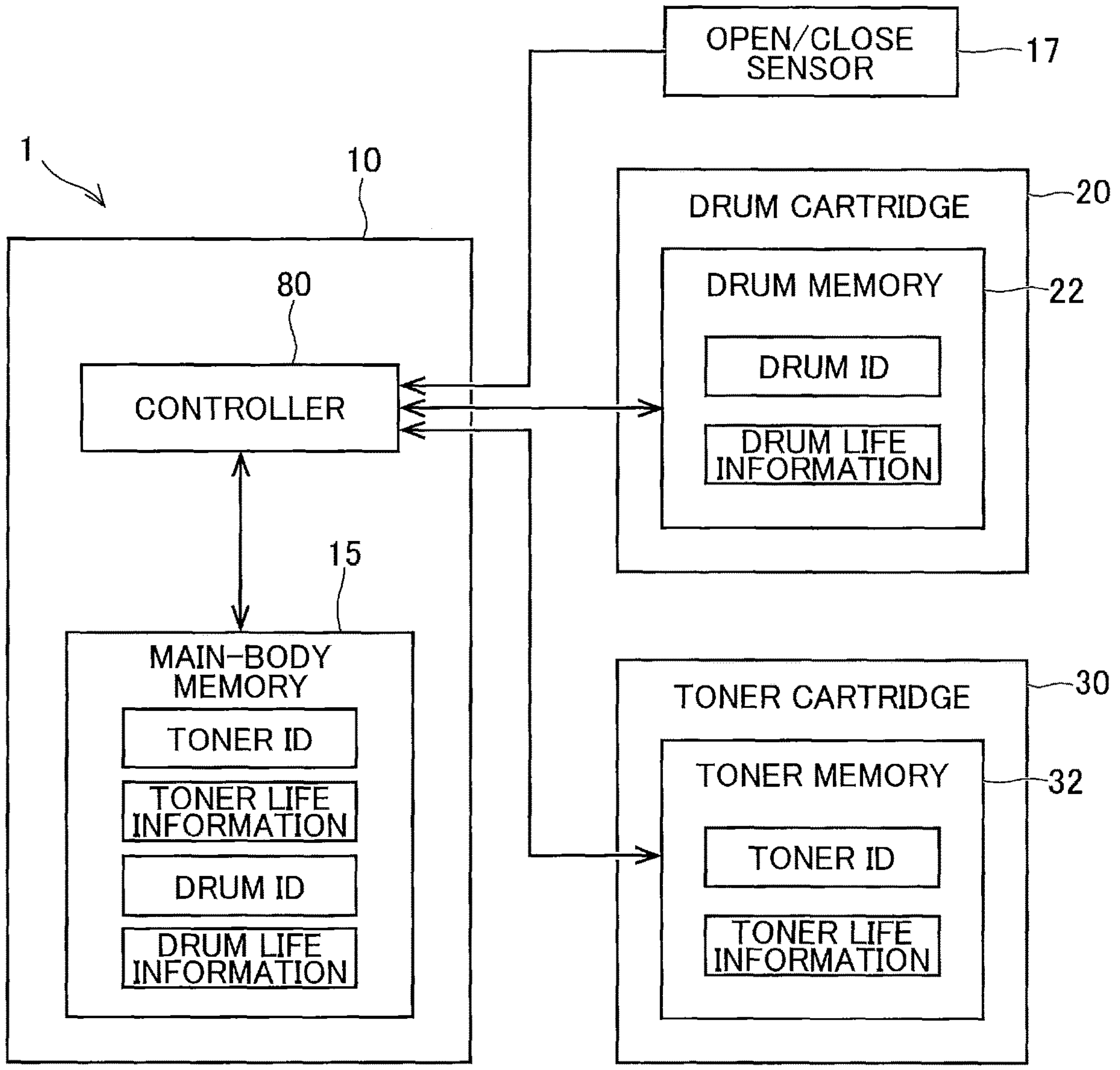
FIG. 2 is a view illustrating a connection among a controller, a drum memory, and a toner memory according to the embodiment.

FIG. 1 is a schematic view of an image forming apparatus 1 according to the embodiment. FIG. 2 illustrates a connection among a controller 80, a drum memory 22, and a toner memory 32 according to the embodiment. The image forming apparatus 1 is an electrophotographic printer. The image forming apparatus 1 may be, for example, an LED (light-emitting diode) printer. The image forming apparatus 1 includes a main-body casing 10, a cover 11, a main-body memory 15 (see FIG. 2), four drum cartridges 20, four toner cartridges 30, four light source units (not illustrated), a transfer belt 70, and the controller 80. In FIG. 2, one of the drum cartridges 20 and one of the toner cartridges 30 are illustrated. The drum cartridges 20 and the toner cartridges 30 are examples of consumable cartridges.

The main-body casing 10 has a rectangular box shape and accommodates the main-body memory 15, the four drum cartridges 20, the four toner cartridges 30, the transfer belt 70, and the controller 80. The main-body casing 10 includes four cartridge holders 13. Each cartridge holder 13 has an opening. The image forming apparatus 1 may include a display portion such as a liquid-crystal display or a lamp, and an input portion such as a button. The display portion or the input portion is positioned on an outer surface of the main-body casing 10. The liquid-crystal display may serve as a touch panel to function as the input portion.

As illustrated in FIG. 1, the cover 11 is pivotally movable about a rotational axis 11*a* between an open position indicated by a solid line and a close position indicated by a two dot chain line. The rotational axis 11*a* extends in the first direction. In a case where the cover 11 is positioned at the open position, the openings of the four cartridge holders 13 are open. In a case where the cover 11 is positioned at the close position, the openings of the four cartridge holders 13 are covered by the cover 11.

The main-body casing 10 includes an open/close sensor 17. The open/close sensor 17 detects the opening and closing of the cover 11. The open/close sensor 17 includes a photosensor and a pressure sensor, for example. The open/close sensor 17 is electrically connected to the controller 80. For example, in a case where the cover 11 is opened or closed to deal with jam or replace the drum cartridge 20 or the toner cartridge 30, the open/close sensor 17 detects the opening or closing of the cover 11 and outputs a signal indicating the detection of the opening or closing of the cover 11 to the controller 80.

In a state where the toner cartridge 30 is mounted on the drum cartridge 20, the drum cartridge 20 is detachably attachable to the cartridge holding portion 13. As illustrated in FIG. 1, the drum cartridge 20 includes a photosensitive drum 21. The photosensitive drum 21 is a hollow cylindrical member extending in the first direction. The photosensitive drum 21 is rotatable about a drum axis extending in the first direction. The photosensitive drum 21 has an outer peripheral surface made from a photosensitive material. Further, the drum cartridge 20 includes a drum memory 22. Data reading and data writing is attainable from and in the drum memory 22. A flash ROM or an EEPROM is an example of the drum memory 22.

The drum memory 22 is a storage medium in which information related to the photosensitive drum 21 of the drum cartridge 20 is storable. Specifically, the drum memory 22 stores drum ID (drum identification information) and drum life information. The drum ID is a serial number for individually identifying the drum cartridge 20. The drum life information is at least one of cumulative rotation number of the photosensitive drum 21 and a cumulative number of printed sheets using the photosensitive drum 21. As to the drum cartridge 20 identified by the drum identification ID, the cumulative rotation number of the photosensitive drum 21 is calculated by increment or decrement of number of rotation each time printing operation is performed. Further, as to the drum cartridge 20 identified by the drum ID, the cumulative number of printed sheets is calculated by increment or decrement of number of printed sheets each time printing operation is performed.

Further, the drum memory 22 may also store information of matching model to which the drum cartridge 20 is installable, information of specification of the drum cartridge 20, information whether the drum cartridge 20 is new or used, information whether or not the drum cartridge 20 is a genuine product, and information related to error history as to the drum cartridge 20.

The toner cartridge 30 is detachably attachable to the drum cartridge 20. The toner cartridge 30 includes a developing roller 31, a casing in which developing agent (toner, for example) is accommodatable. Four toner cartridges 30 accommodate therein developing agents of different colors (cyan, magenta, yellow, and black, for example). The developing roller 31 is a cylindrical member extending in the first direction. The developing roller 31 is rotatable about a developing axis extending in the first direction. In a case where the toner cartridge 30 is attached to the drum cartridge 20, an outer peripheral surface of the photosensitive drum 21 contacts an outer peripheral surface of the developing roller 31. The toner cartridge 30 further includes the toner memory 32. The toner memory 32 is positioned at an outer surface of one side of the toner cartridge 30 in the first direction. Data reading and data writing is attainable from and in the toner memory 32. A flash ROM or an EEPROM is an example of the toner memory 32.

The toner memory 32 is configured to store information related to the toner cartridge 30. Specifically, the toner memory 32 stores toner ID (toner identification information) and toner life information. The toner ID is, for example, serial number for individually identifying the toner cartridge 30. The toner life information is, for example, at least one of cumulative rotation number of the developing roller 31, cumulative number of printed sheets using the developing roller 31, and cumulative amount of used toner by the developing roller 31. As to the toner cartridge 30 identified by the toner ID, the cumulative rotation number of the developing roller 31 is calculated by increment or decrement of number of rotation each time printing operation is performed. Further, as to the toner cartridge 30 identified by the toner ID, the cumulative number of printed sheets is calculated by increment or decrement of number of printed sheets each time printing operation is performed. Further, as to the toner cartridge 30 specified by the toner ID, the cumulative amount of used toner is calculated by increment or decrement of an amount of used toner each time printing operation is performed.

The drum cartridge 20 to which the toner cartridge 30 is attached is attached to the body casing 10 in a case where the cover 11 is positioned at the open position. At this time, the drum cartridge 20 to which the toner cartridge 30 is attached is inserted into the cartridge holding portion 13 through the opening.

Four light source units are attached to an inner surface of the cover 11, for example. In a case the drum cartridge 20 is attached to the body casing 10 and the cover 11 is at the closed position, each light source unit faces an outer peripheral surface of the corresponding photosensitive drum 21. Further, each light source unit includes a plurality of light sources arrayed with each other in the first direction. The light source is configured to irradiate light to the outer peripheral surface of the photosensitive drum 21. An LED (light emitting diode) is an example of the light source.

The light source unit is electrically connected to the controller 80. The controller 80 is configured to permit the plurality of light sources to emit light in response to image data input in the controller 80. Hence, the light source irradiates light to the outer peripheral surface of the photosensitive drum 21. As a result, the photosensitive material of the outer peripheral surface is exposed to light depending on the image data.

The transfer belt 40 is an annular (endless) belt contactable with the photosensitive drum 21. The outer peripheral surface of the photosensitive drum 21 is contactable with the outer peripheral surface of the transfer belt 40. During printing process, the printing sheet is conveyed to a portion between the transfer belt 70 and the photosensitive drum 21. The transfer belt 40 is looped over a drive roller and a driven roller. The drive roller is configured to drive the transfer belt 40. The controller 80 is configured to control the drive roller to rotate. The driven roller is rotated in accordance with a circular movement of the transfer belt 70 driven by the drive roller.

The controller 80 includes an application-specific integrated circuit (ASIC), for example. The controller 80 is electrically connected to the main-body memory 15 provided in the main-body casing 10. By performing various processes, the controller 80 causes the image forming apparatus 1 to perform a printing process and processes associated with the printing process. The controller 80 may include a processor such as a central processing unit (CPU). In this case, the processor may operate according to a computer program stored in the main-body memory 15, so that the controller 80 can cause the image forming apparatus 1 to perform the printing process.

As illustrated in FIG. 2, in a case where the toner cartridge 30 attached to the drum cartridge 20 is attached to the cartridge holder 13, the toner memory 32 is electrically connected to the controller 80. Accordingly, the controller 80 can perform a process of reading information from the toner memory 32 and a process of writing information to the toner memory 32. In the writing process, the controller 80 may additionally write new data or delete original data to rewrite new data. In a case where the drum cartridge 20 is attached to the cartridge holder 13, the drum memory 22 is electrically connected to the controller 80. Accordingly, the controller 80 can perform a process of reading information from the drum memory 22 and a process of writing information to the drum memory 22.

The main-body memory 15 can write and read information. The main-body memory 15 is, for example, a flash read-only memory (ROM) or an electrically erasable programmable read-only memory (EEPROM). The main-body memory 15 stores toner ID and toner life information which are read from the toner memory 32. The main-body memory 15 stores drum ID and drum life information which are read from the drum memory 22.

In a case where the drum cartridge 20 is attached to the main-body casing 10, the controller 80 performs processes of reading drum ID and drum life information which are stored in the drum memory 22 and storing the read drum ID and the read drum life information in the main-body memory 15 (a drum identification information storing process and a drum life information storing process). In a case where the toner cartridge 30 is attached to the main-body casing 10, the controller 80 performs processes of reading toner ID and toner life information stored in the toner memory 32 and storing the read toner ID and the read toner life information in the main-body memory 15 (a toner identification information storing process and a toner life information storing process).

Processing of Controller 80

Figure 3:
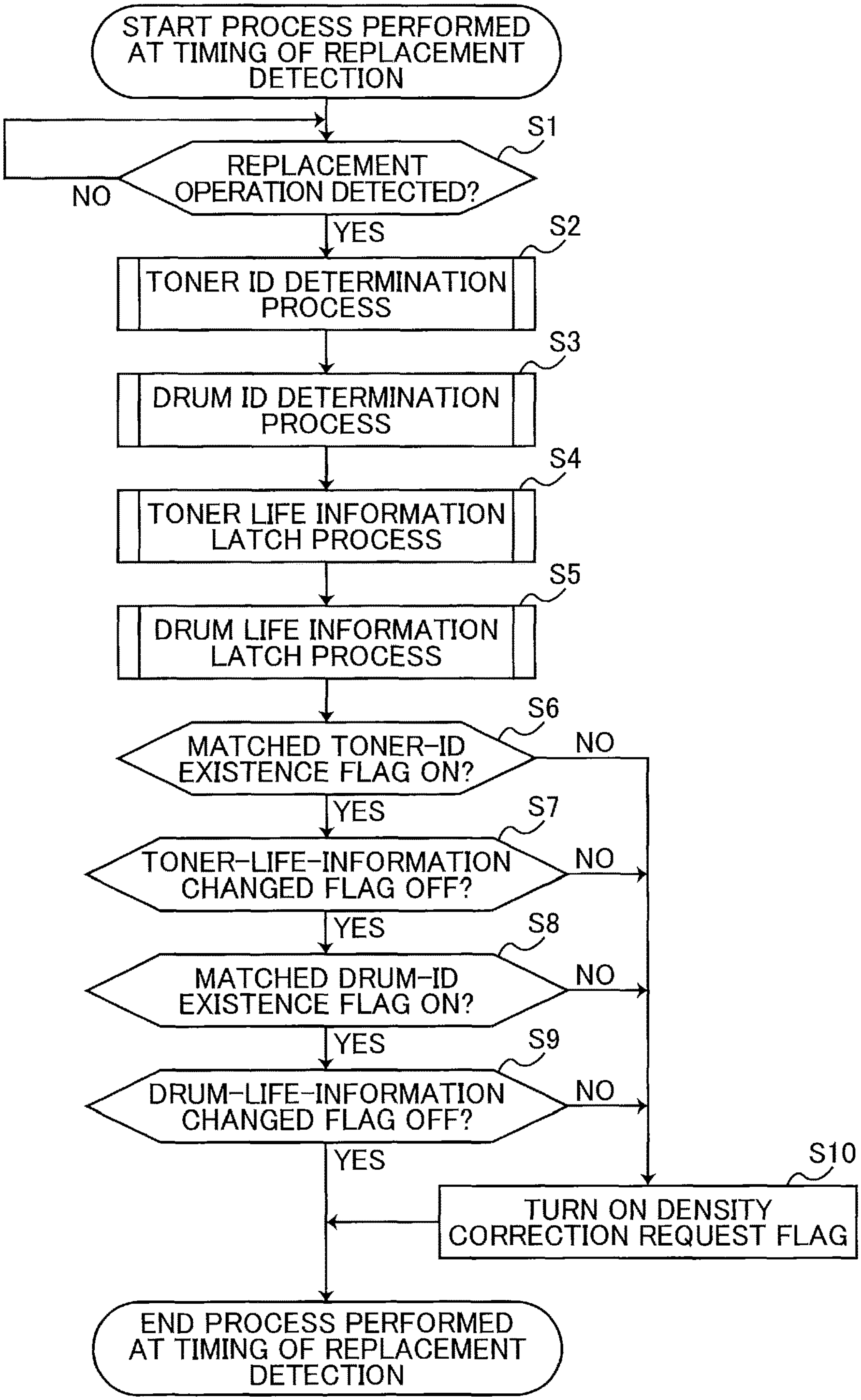
FIG. 3 is a flowchart illustrating a process performed at the timing of replacement detection performed by the controller.

FIG. 3 is a flowchart of a process performed at the timing of replacement detection. The controller 80 performs this process in a case where the drum cartridge 20 or the toner cartridge 30 is replaced. First, the controller 80 performs a replacement determination process S1. In the replacement determination process S1, the controller 80 determines whether or not an operation related to the replacement of the drum cartridge 20 or the toner cartridge 30 (hereinafter referred to as "replacement operation") is detected. In the replacement determination process S1, in a case where the image forming apparatus 1 is powered on or the open/close sensor 17 detects the movement of the cover 11 from the open position to the close position, the controller 80 determines that the replacement operation is detected.

In a case where the controller 80 determines in the replacement determination process S1 that the replacement operation is detected, the controller 80 performs a toner ID determination process S2 (a toner identification information determination process) and a drum ID determination process S3 (a drum identification information determination process). The toner ID determination process S2 and the drum ID determination process S3 may be executed in arbitrary order. The controller 80 performs the toner ID determination process S2 and the drum ID determination process S3 after the controller 80 receives a signal indicating that the cover 11 is moved from the open position to the close position. Accordingly, the controller 80 can perform these processes after the drum cartridge 20 or the toner cartridge 30 is replaced and the cover 11 is closed.

Figure 4:
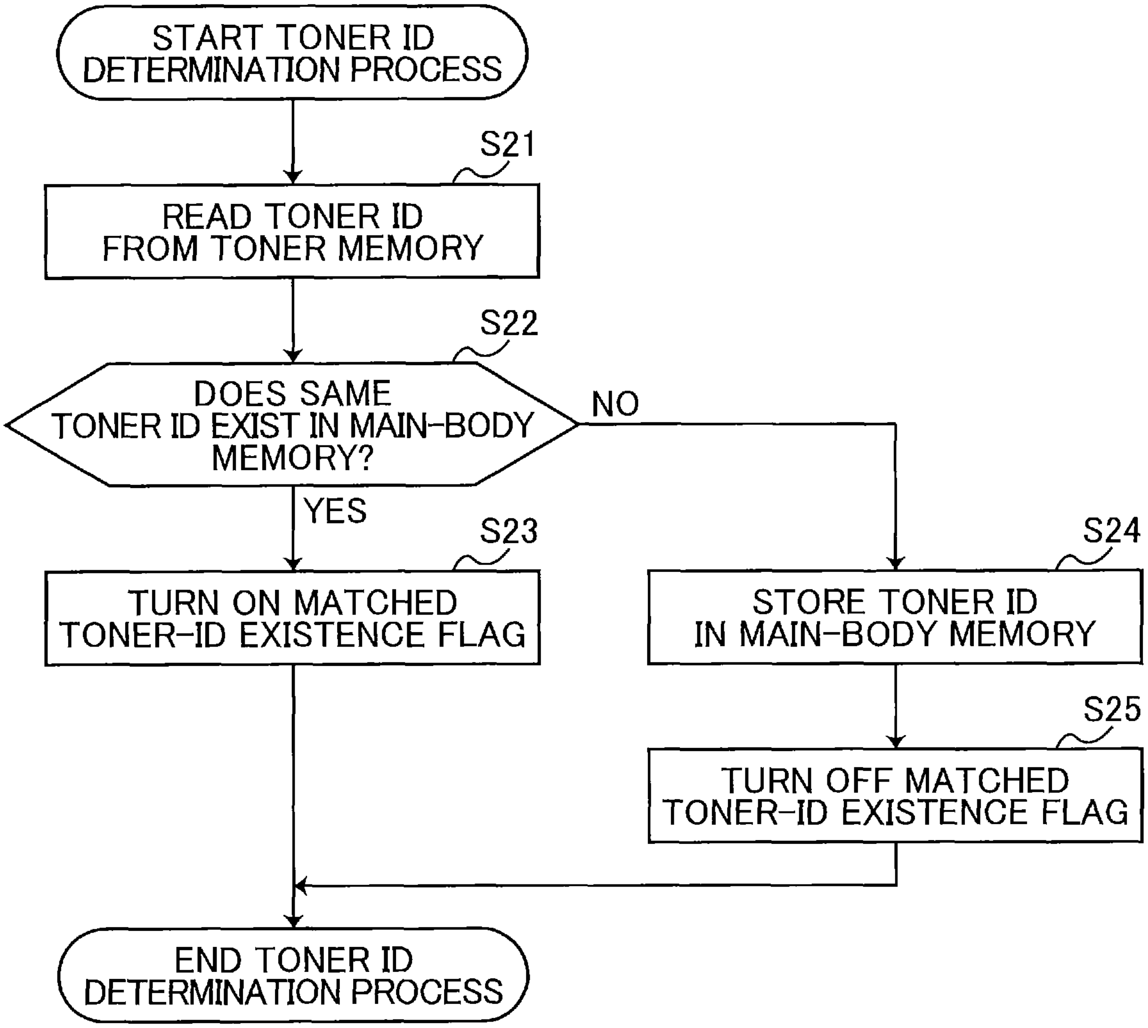
FIG. 4 is a flowchart illustrating a toner ID determination process performed by the controller.

FIG. 4 is a flowchart of the toner ID determination process S2 (toner identification information determination process) performed by the controller 80. In a case where the controller 80 determines in the replacement determination process S1 that the replacement operation is detected, the controller 80 determines, in the toner ID determination process S2, whether toner ID stored in the toner memory 32 matches toner ID stored in the main-body memory 15. Specifically, as illustrated in FIG. 4, in a case where the controller 80 starts the toner ID determination process S2, the controller 80 performs a toner ID reading process S21. In the toner ID reading process S21, the controller 80 reads toner ID from the toner memory 32. After the toner ID reading process S21, the controller 80 performs a matching determination process S22. In the matching determination process S22, the controller 80 determines whether or not the toner ID read from the toner memory 32 in the toner ID reading process S21 matches the toner ID stored in the main-body memory 15.

In a case where the controller 80 determines in the matching determination process S22 that the toner ID read from the toner memory 32 matches the toner ID stored in the main-body memory 15 (YES in the matching determination process S22), the controller 80 performs a flag process S23. In the flag process S23, the controller 80 turns on a "matched toner-ID existence flag". The "matched toner-ID existence flag" is flag information stored in the main-body memory 15. The flag information is a sign indicating whether a certain condition is satisfied or not. The "matched toner-ID existence flag" indicates whether or not the toner ID stored in the toner memory 32 matches the toner ID stored in the main-body memory 15.

In a case where the controller 80 determines in the matching determination process S22 that the toner ID read from the toner memory 32 does not match the toner ID stored in the main-body memory 15 (NO in the matching determination process S22), the controller 80 performs a toner ID update process S24 (toner identification information update process). In the toner ID update process S24, the controller 80 stores in the main-body memory 15 the toner ID read in the toner ID reading process S21. In a case where the toner ID read from the toner memory 32 does not match the toner ID stored in the main-body memory 15, there is a possibility that the toner cartridge 30 may be replaced. Therefore, the controller 80 performs the toner ID update process S24 to store the toner ID of the new toner cartridge 30 in the main-body memory 15.

After the toner ID update process S24, the controller 80 performs a flag-off process S25. In the flag process S25, the controller 80 turns off the "matched toner-ID existence flag". After the flag process S23 or the flag process S25, the controller 80 ends the toner ID determination process S2. In a case where more than one toner cartridge 30 is mounted in the main-body casing 10, the controller 80 performs the toner ID determination process S2 for each toner cartridge 30.

Figure 5:
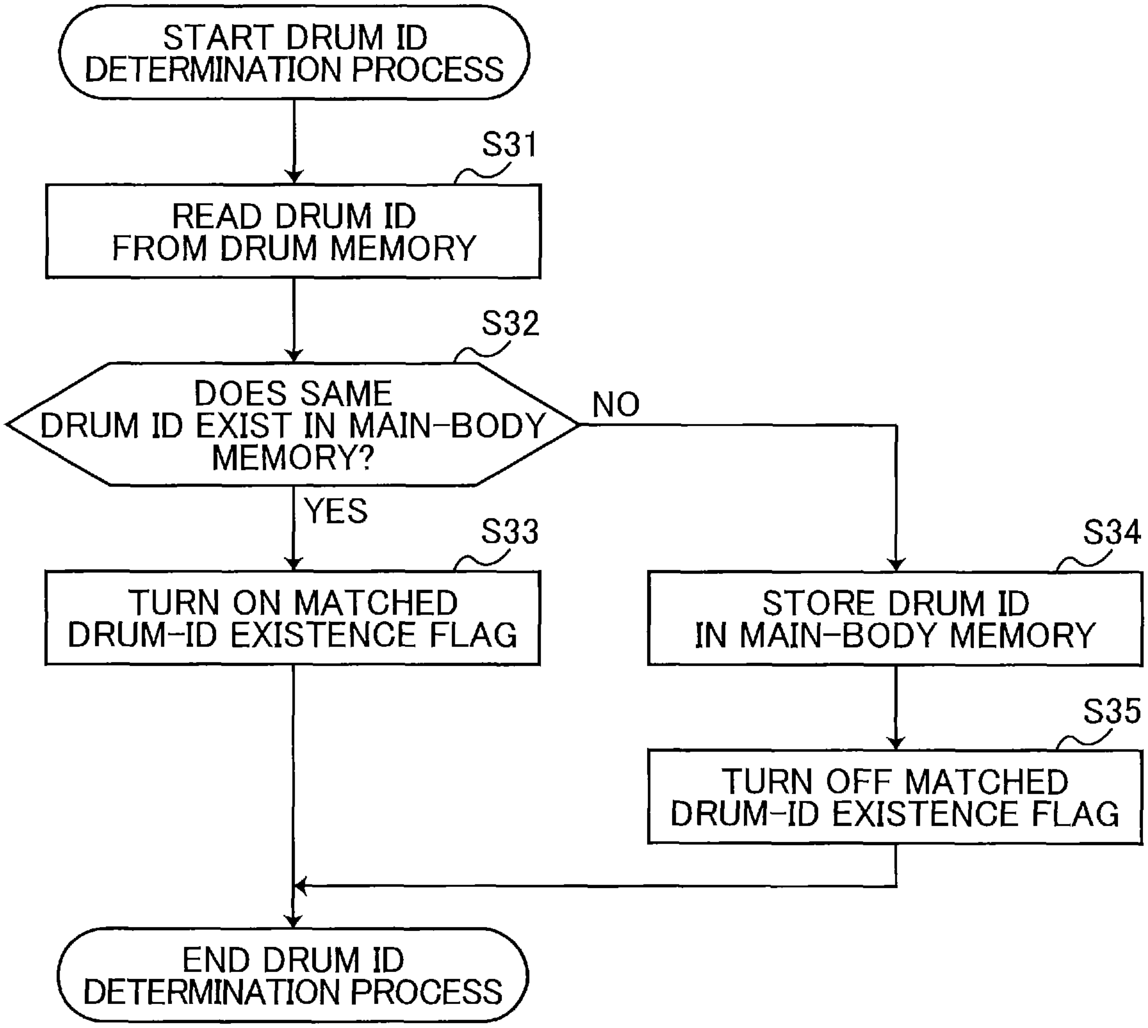
FIG. 5 is a flowchart illustrating a drum ID determination process performed by the controller.

FIG. 5 is a flowchart of the drum ID determination process S3 (drum identification information determination process) performed by the controller 80. In a case where the controller 80 determines in the replacement determination process S1 that the replacement operation is detected, the controller 80 determines, in the drum ID determination process S3, whether drum ID stored in the drum memory 22 matches drum ID stored in the main-body memory 15. As illustrated in FIG. 5, in a case where the controller 80 starts the drum ID determination process S3, the controller 80 performs a drum ID reading process S31. In the drum ID reading process S31, the controller 80 reads drum ID from the drum memory 22. After the drum ID reading process S31, the controller 80 performs a matching determination process S32. In the matching determination process S32, the controller 80 determines whether or not the drum ID read from the drum memory 22 in the drum ID reading process S31 matches the drum ID stored in the main-body memory 15.

In a case where the controller 80 determines in the matching determination process S32 that the drum ID read from the drum memory 22 matches the drum ID stored in the main-body memory 15 (YES in the matching determination process S32), the controller 80 performs a flag process S33. In the flag process S33, the controller 80 turns on a "matched drum-ID existence flag". The "matched drum-ID existence flag" is flag information stored in the main-body memory 15 and indicates whether or not the drum ID stored in the drum memory 22 matches the drum ID stored in the main-body memory 15.

In a case where the controller 80 determines in the matching determination process S32 that the drum ID read from the drum memory 22 does not match the drum ID stored in the main-body memory 15 (NO in the matching determination process S32), the controller 80 performs a drum ID update process S34 (drum identification information update process). In the drum ID update process S34, the controller 80 stores in the main-body memory 15 the drum ID which is read in the drum ID reading process S31. In a case where the drum ID read from the drum memory 22 does not match the drum ID stored in the main-body memory 15, there is a possibility that the drum cartridge 20 may be replaced. Therefore, the controller 80 performs the drum ID update process S34 to store the drum ID of the new drum cartridge 20 in the main-body memory 15.

After the drum ID update process S34, the controller 80 performs a flag-off process S35. In the flag-off process S35, the controller 80 turns off the "matched drum-ID existence flag". After the flag process S33 or the flag-off process S35, the controller 80 ends the drum ID determination process S3. In a case where a plurality of drum cartridges 20 is mounted in the main-body casing 10, the controller 80 performs the drum ID determination process S3 for each drum cartridge 20.

Returning to FIG. 3, after the controller 80 ends the toner ID determination process S2 and the drum ID determination process S3, the controller 80 performs a toner life information latch process S4 and a drum life information latch process S5. The toner life information latch process S4 and the drum life information latch process S5 may be executed in arbitrary order.

Figure 6:
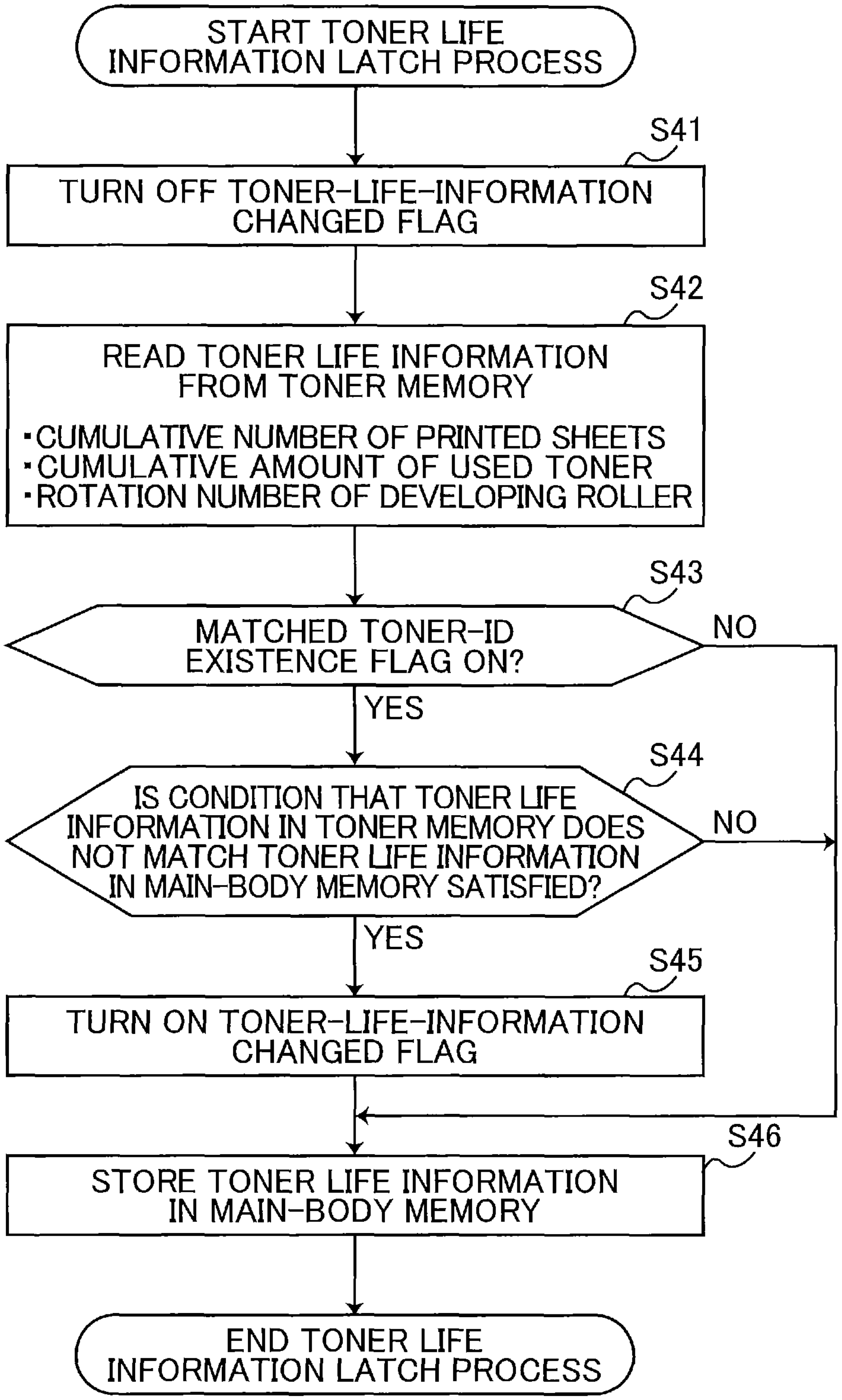
FIG. 6 is a flowchart illustrating a toner life information latch process performed by the controller.

FIG. 6 is a flowchart of the toner life information latch process S4 performed by the controller 80. In a case where the controller 80 starts the toner life information latch process S4, the controller 80 performs a flag-off process S41. In the flag-off process S41, the controller 80 turns off a "toner-life-information changed flag". The "toner-life-information changed flag" is flag information stored in the main-body memory 15 and indicates whether or not toner life information stored in the toner memory 32 matches toner life information stored in the main-body memory 15 (whether or not the difference between the toner life information stored in the toner memory 32 and the toner life information stored in the main-body memory 15 is equal to or less than a predetermined threshold value). After the flag-off process S41, the controller 80 performs a toner information reading process S42. In the toner information reading process S42, the controller 80 reads toner life information from the toner memory 32.

After the toner information reading process S42, the controller 80 performs a flag determination process S43. In the flag determination process S43, the controller 80 determines whether the "matched toner-ID existence flag" is ON. In a case where the controller 80 determines that the "matched toner-ID existence flag" is turned on in the flag process S23 illustrated in FIG. 4 (YES in the flag determination process S43), the controller 80 performs a matching determination process S44 (toner life information determination process). In the matching determination process S44, the controller 80 determines whether or not the toner life information read from the toner memory 32 in the toner information reading process S42 matches the toner life information stored in the main-body memory 15. In a case where the controller 80 determines that the "matched toner-ID existence flag" is OFF (NO in the flag determination process S43), the controller 80 performs a toner life information update process S46 described later.

The matching determination process S44 may include a process to determine whether the difference between the toner life information stored in the toner memory 32 and the toner life information stored in the main-body memory 15 exceeds a predetermined threshold value. The predetermined threshold value is stored in the main-body memory 15 in advance. For example, in a case where the difference in the cumulative number of printed sheets, which is one piece of information among pieces of information included in the toner life information, exceeds the predetermined threshold value, the controller 80 determines in the matching determination process S44 that the toner life information stored in the toner memory 32 does not match the toner life information stored in the main-body memory 15. The controller 80 may determine in the matching determination process S44 that the toner life information stored in the toner memory 32 does not match the toner life information stored in the main-body memory 15 in a case where there is a difference in at least one of the pieces of information (three pieces of information in this example) included in the toner life information or in a case where there are differences in two or more pieces of information included in the toner life information.

In a case where the controller 80 determines in the matching determination process S44 that a condition that the toner life information stored in the toner memory 32 does not match the toner life information stored in the main-body memory 15 is satisfied (YES in the matching determination process S44), the controller 80 performs a flag process S45. In the flag process S45, the controller 80 turns on the "toner-life-information changed flag". After the flag process S45, the controller 80 performs the toner life information update process S46. In a case where the controller 80 determines in the matching determination process S44 that the condition that the toner life information stored in the toner memory 32 does not match the toner life information stored in the main-body memory 15 is not satisfied (NO in the matching determination process S44), the controller 80 performs the toner life information update process S46.

In the toner life information update process S46, the controller 80 stores in the main-body memory 15 the toner life information which is stored in the toner memory 32. For example, in a case where the toner cartridge 30 is replaced just before the replacement determination process S1, the controller 80 determines in the flag determination process S43 that the "matched toner-ID existence flag" is OFF. As another example, in a case where the toner cartridge 30 is used by another image forming apparatus and the toner life information stored in the toner memory 32 is updated, it is likely that the controller 80 determines in the matching determination process S44 that the toner life information stored in the toner memory 32 does not match the toner life information stored in the main-body memory 15. As described above, in a case where the toner cartridge 30 is replaced or used, the controller 80 performs the toner life information update process S46 to update the toner life information stored in the main-body memory 15 to the toner life information stored in the toner memory 32.

Figure 7:
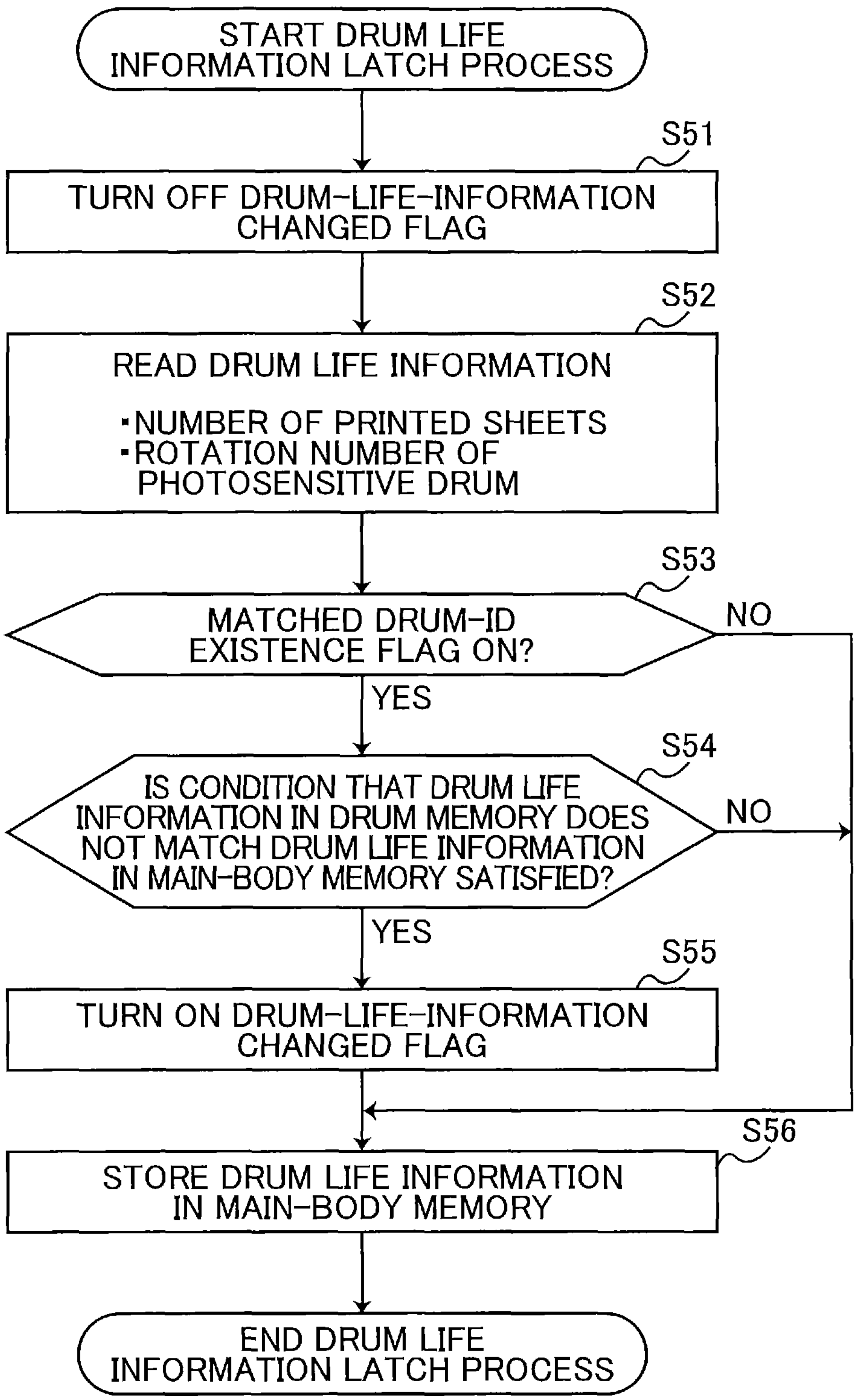
FIG. 7 is a flowchart illustrating a drum life information latch process performed by the controller.

FIG. 7 is a flowchart of the drum life information latch process S5 performed by the controller 80. In a case where the controller 80 starts the drum life information latch process S5, the controller 80 performs a flag-off process S51. In the flag-off process S51, the controller 80 turns off a "drum-life-information changed flag". The "drum-life-information changed flag" is flag information stored in the main-body memory 15 and indicates whether or not drum life information stored in the drum memory 22 matches drum life information stored in the main-body memory 15 (whether or not the difference between the drum life information stored in the drum memory 22 and the drum life information stored in the main-body memory 15 is equal to or less than a predetermined threshold value). After the flag-off process S51, the controller 80 performs a drum information reading process S52. In the drum information reading process S52, the controller 80 reads drum life information from the drum memory 22.

After the drum information reading process S52, the controller 80 performs a flag determination process S53. In the flag determination process S53, the controller 80 determines whether the "matched drum-ID existence flag" is ON.

In a case where the controller 80 determines that the "matched drum-ID existence flag" is turned on in the flag process S33 illustrated in FIG. 5 (YES in the flag determination process S53), the controller 80 performs a matching determination process S54 (drum life information determination process). In the matching determination process S54, the controller 80 determines whether or not the drum life information read from the drum memory 22 in the drum information reading process S52 matches the drum life information stored in the main-body memory 15. In a case where the controller 80 determines that the "matched drum-ID existence flag" is OFF (NO in the flag determination process S53), the controller 80 performs a drum life information update process S56 described later.

In the matching determination process S54, the controller 80 may determine whether the difference between the drum life information stored in the drum memory 22 and the drum life information stored in the main-body memory 15 exceeds a predetermined threshold value. The predetermined threshold value is stored in the main-body memory 15 in advance. For example, the difference in the cumulative number of printed sheets, which is one piece of information among pieces of information included in the toner life information, exceeds the predetermined threshold value, the controller 80 determines in the matching determination process S54 that the drum life information stored in the drum memory 22 does not match the drum life information stored in the main-body memory 15. The controller 80 may determine in the matching determination process S54 that the drum life information stored in the drum memory 22 does not match the drum life information stored in the main-body memory 15 in a case where there is a difference in at least one of the pieces of information (three pieces of information in this example) included in the drum life information or in a case where there are differences in two or more pieces of information included in the drum life information.

In a case where the controller 80 determines in the matching determination process S54 that a condition that the drum life information stored in the drum memory 22 does not match the drum life information stored in the main-body memory 15 is satisfied (YES in the matching determination process S54), the controller 80 performs a flag process S55. In the flag process S55, the controller 80 turns on the "drum-life-information changed flag". After the flag process S55, the controller 80 performs the drum life information update process S56. In a case where the controller 80 determines in the matching determination process S54 that the condition that the drum life information stored in the drum memory 22 does not match the drum life information stored in the main-body memory 15 is not satisfied (NO in the matching determination process S54), the controller 80 performs the drum life information update process S56.

In the drum life information update process S56, the controller 80 stores in the main-body memory 15 the drum life information which is stored in the drum memory 22. For example, in a case where the drum cartridge 20 is replaced just before the replacement determination process S1, the controller 80 determines in the flag determination process S53 that the "matched drum-ID existence flag" is OFF. As another example, in a case where the drum cartridge 20 is used by another image forming apparatus and the drum life information stored in the drum memory 22 is updated, it is likely that the controller 80 determines in the matching determination process S54 that the drum life information stored in the drum memory 22 does not match the drum life information stored in the main-body memory 15. In a case where the drum cartridge 20 is replaced or used, the controller 80 performs the drum life information update process S56 to update the drum life information stored in the main-body memory 15 to the drum life information stored in the drum memory 22.

In a case where a plurality of toner cartridges 30 is mounted in the main-body casing 10, the controller 80 performs the toner life information latch process S4 for each toner cartridge 30. In a case where a plurality of drum cartridges 20 is mounted in the main-body casing 10, the controller 80 performs the drum life information latch process S5 for each drum cartridge 20.

Referring back to FIG. 3, after the toner life information latch process S4 and the drum life information latch process S5, the controller 80 performs a flag determination process S6. In the flag determination process S6, the controller 80 checks the "matched toner-ID existence flag". In a case where the controller 80 determines that the "matched toner-ID existence flag" is ON (YES in the flag determination process S6), the controller 80 performs a flag determination process S7. In a case where the controller 80 determines that the "matched toner-ID existence flag" is OFF (NO in the flag determination process S6), the controller 80 performs a flag process S10. In the flag process S10, the controller 80 turns on a "density correction request flag". The "density correction request flag" is flag information stored in the main-body memory 15 and indicates whether to request density correction or not. The flag process S10 is an example of a request process for requesting the density correction.

In the flag determination process S7, the controller 80 checks the "toner-life-information changed flag". In a case where the "toner-life-information changed flag" is OFF (YES in the flag determination process S7), the controller 80 performs a flag determination process S8. In a case where the "toner-life-information changed flag" is ON (NO in the flag determination process S7), the controller 80 performs the flag process S10.

In a case where a plurality of toner cartridges 30 is mounted in the main-body casing 10, the controller 80 may perform the flag determination processes S6 and S7 for each toner cartridge 30.

In the flag determination process S8, the controller 80 checks the "matched drum-ID existence flag". In a case where the "matched drum-ID existence flag" is ON (YES in the flag determination process S8), the controller 80 performs a flag determination process S9. In a case where the "matched drum-ID existence flag" is OFF (NO in the flag determination process S8), the controller 80 performs the flag process S10.

In the flag determination process S9, the controller 80 checks the "drum-life-information changed flag". In a case where the "drum-life-information changed flag" is OFF (YES in the flag determination process S9), the controller 80 skips the flag process S10 and ends the process performed at the timing of replacement detection. In a case where the "drum-life-information changed flag" is ON (NO in the flag determination process S9), the controller 80 performs the flag process S10.

In a case where a plurality of one drum cartridges 20 is mounted in the main-body casing 10, the controller 80 may perform the flag determination processes S8 and S9 for each drum cartridge 20.

Figure 8:
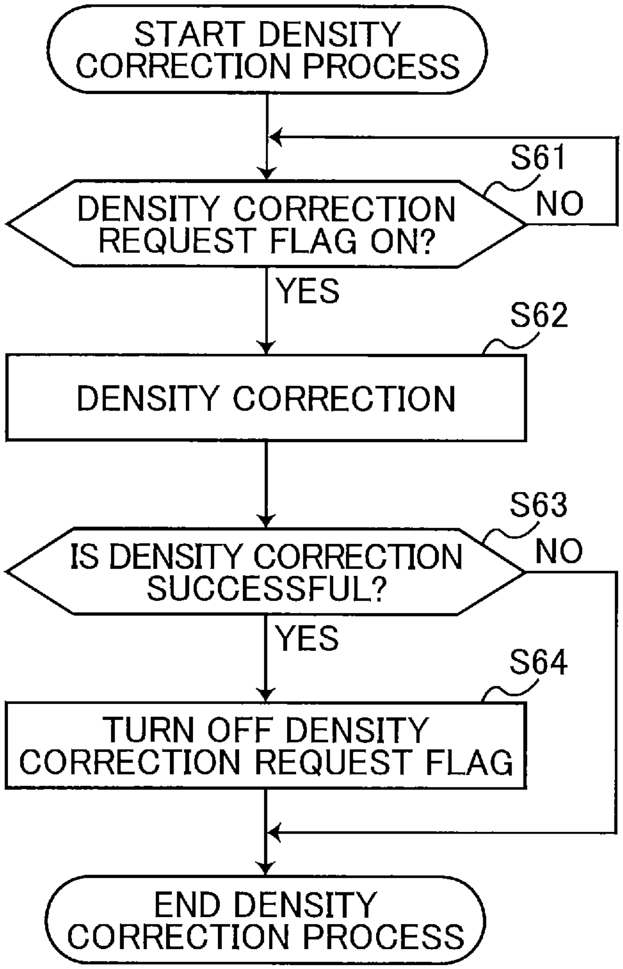
FIG. 8 is a flowchart of a density correction process performed by the controller.

FIG. 8 is a flowchart of a density correction process performed by the controller 80. In the density correction process, the density of a developer to be supplied to a printing material is corrected. In the density correction request process, the controller 80 performs a flag determination process S61. In the flag determination process S61, the controller 80 checks the "density correction request flag". In a case where the "density correction request flag" is ON (YES in the flag determination process S61), the controller 80 performs a density correction process S62. In the density correction process S62, an electrostatic latent image corresponding to a test toner image is formed on a corresponding photosensitive drum 21. Supplying toner on a corresponding developing roller 31 to the electrostatic latent image forms the test toner image on the photosensitive drum 21. Subsequently, the test toner image on the photosensitive drum 21 is transferred to the transfer belt 70 by transfer rollers, and the density of the developer on the transfer belt 70 is detected by a photosensor (not illustrated). Based on the result of the detection, the developing voltage and the charging voltage are corrected.

After the density correction process S62, the controller 80 performs a determination process S63. In the determination process S63, the controller 80 determines whether the density correction process S62 is successful. In a case where the controller 80 determines that the density correction process S62 is successful (YES in the determination process S63), the controller 80 performs a flag-off process S64 (request cancellation process). In the flag-off process S64, the controller 80 turns off the "density correction request flag". In a case where the controller 80 determines that the density correction process S62 is failed (NO in the determination process S63), the controller 80 skips the flag-off process S64 and ends the density correction process. In the determination process S63, for example, in a case where a condition that the developing voltage or the charging voltage after the density correction is within predetermined allowable ranges is satisfied, the controller 80 may determine that the density correction has been successful. In a case where the condition that the developing voltage or the charging voltage after the density correction is within the predetermined allowable range is not satisfied, the controller 80 may determine that the density correction is failed.

In a case where the controller 80 determines in the flag determination process S6 that the "matched toner-ID existence flag" is OFF or determines in the flag determination process S8 that the "matched drum-ID existence flag" is OFF, the controller 80 performs the flag process S10. In the flag process S10, the controller 80 turns on the "density correction request flag". Specifically, in a case where the controller 80 determines that the toner ID stored in the toner memory 32 does not match the toner ID stored in the main-body memory 15, the controller 80 performs the request process (flag process S10) to request the density correction. In a case where the controller 80 determines that the drum ID stored in the drum memory 22 does not match the drum ID stored in the main-body memory 15, the controller 80 also performs the request process (flag process S10) to request the density correction. Accordingly, in a case where the toner cartridge 30 or the drum cartridge 20 has been replaced, the controller 80 can request the density correction.

In a case where the controller 80 determines in the flag determination process S6 that the "matched toner-ID existence flag" is ON and also determines in the flag determination process S7 that the "toner-life-information changed flag" is ON, the controller 80 turns on the "density correction request flag" (flag process S10). Specifically, in a case where the controller 80 determines that the toner ID stored in the toner memory 32 matches the toner ID stored in the main-body memory 15 and further determines that the toner life information stored in the toner memory 32 does not match the toner life information stored in the main-body memory 15, the controller 80 performs the request process (flag process S10) to request the density correction. Accordingly, in a case where the toner cartridge 30 is used by another image forming apparatus and the toner life information of the toner cartridge 30 is updated, the controller 80 can also request the density correction.

In a case where the controller 80 determines in the flag determination process S8 that the "matched drum-ID existence flag" is ON and also determines in the flag determination process S9 that the "drum-life-information changed flag" is ON, the controller 80 turns on the "density correction request flag" (flag process S10). Specifically, in a case where the controller 80 determines that the drum ID stored in the drum memory 22 matches the drum ID stored in the main-body memory 15 and further determines that the drum life information stored in the drum memory 22 does not match the drum life information stored in the main-body memory 15, the controller 80 performs the request process (flag process S10) to request the density correction. Accordingly, in a case where the drum cartridge 20 is used by another image forming apparatus and the drum life information of the drum cartridge 20 is updated, the controller 80 can also request the density correction.

2. Modification

In the above-described embodiment, one toner cartridge 30 is mounted in one drum cartridge 20. Alternatively, four toner cartridges may be mounted in one drum cartridge. In this case, the image forming apparatus includes one drum memory and four toner memories. In another embodiment, the image forming apparatus may be a monochrome printer and include one drum cartridge and one toner cartridge.

While the disclosure has been described in detail with reference to the specific embodiment thereof, the above description is an example of all the aspects, and the disclosure should not be limited thereto. It would be apparent that various modifications not illustrated are assumed without departing from the scope of the disclosure. All or part of elements of the above described embodiment and modification can be combined or omitted unless such combinations or omissions provide inconsistency.

What is claimed is:

1. An image forming apparatus comprising:

at least one toner cartridge;

at least one replaceable unit for use with the toner cartridge, the replaceable unit including:

a unit memory storing unit identification information for identifying the replaceable unit; and a main-body casing to which the replaceable unit is detachably attached, the main-body casing including:

a main-body memory; and a controller configured to perform:

a replacement determination process to determine whether a replacement operation related to replacement of the replaceable unit is detected;

a unit identification information determination process to determine whether or not the unit identification information stored in the unit memory matches the unit identification information which is stored in the main-body memory, in a case where the replacement determination process determines that the replacement operation is detected; and a request process to request execution of a correction process regarding printing according to a determination result in the unit identification information determination process.

2. The image forming apparatus according to claim 1, wherein the controller executes the request process in a case where the unit identification information determination process determines that the unit identification information stored in the unit memory does not match the unit identification information which is stored in the main-body memory in a unit identification information storing process.

3. The image forming apparatus according to claim 1, wherein the request process requests execution of a density correction, as the execution of the correction process regarding printing, to correct a density of developer to be supplied.

4. The image forming apparatus according to claim 1, wherein the replaceable unit is a drum cartridge including a photosensitive drum.

5. The image forming apparatus according to claim 4, wherein the unit memory further stores drum life information indicating a life of the drum cartridge, wherein the controller is configured to further perform:

a drum life information storing process to store the drum life information stored in the unit memory in the main-body memory; and a drum life information determination process to determine whether the drum life information stored in the unit memory matches the drum life information which is stored in the main-body memory in the drum life information storing process in a case where the replacement determination process determines that the replacement operation is detected, wherein the controller executes the request process, in a case where the unit identification information determination process determines that the unit identification information stored in the unit memory matches the unit identification information stored in the main-body memory and the drum life information determination process determines that the drum life information stored in the unit memory does not match the drum life information stored in the main-body memory.

6. The image forming apparatus according to claim 5, wherein the drum life information includes at least one of a cumulative number of printed sheets, and a rotation number of the photosensitive drum.

7. The image forming apparatus according to claim 1, further comprising:

a cover configured to close an opening of the main-body casing; and an open/close sensor configured to detect the cover opened or closed, wherein the controller determines that the replacement operation is detected in the replacement determination process in a case where the open/close sensor detects the cover closed.

8. The image forming apparatus according to claim 1, wherein the request process is a process to store a flag indicating a request for the correction process in the main-body memory, wherein the controller is configured to further perform a request cancel process to cancel the flag from the main-body memory in a case where the correction is successful.

* * * * *